May 19, 1964
N. D. MULLIN
3,133,743
IDLER ARM THRUST BEARING ASSEMBLY
Filed Nov. 8, 1962
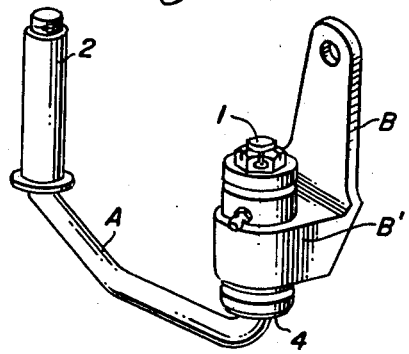
Fig. 1.
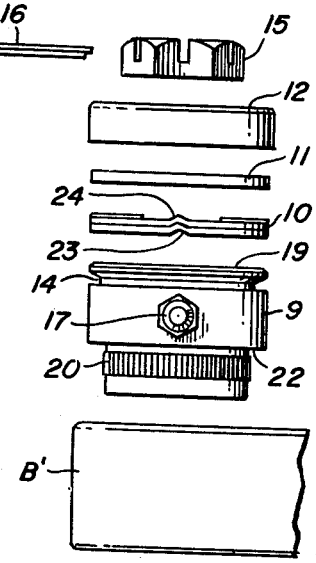
Fig. 3.
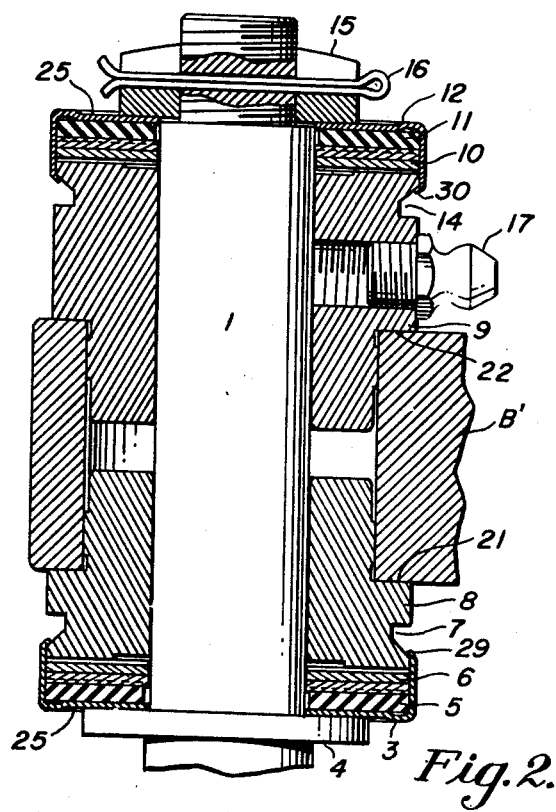
Fig. 2.
INVENTOR.
NEWELL D. MULLIN
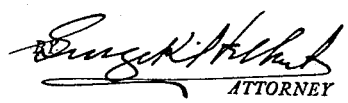
ATTORNEY

United States Patent Office 3,133,743
Patented May 19, 1964

3,133,743
IDLER ARM THRUST BEARING ASSEMBLY
Newell D. Mullin, Pine City, N.Y., assignor to Trayer Products, Incorporated, Elmira, N.Y., a corporation of New York
Filed Nov. 8, 1962, Ser. No. 236,204
2 Claims. (Cl. 280—95)

This invention relates to improvements in automotive vehicle idler arm assemblies of the general type shown in United States Letters Patent 2,809,049, granted October 8, 1957, to Theodore F. Carlson.

In many modern automotive vehicles a steering gear idler arm pivotally connected to the vehicle frame provides support to elements of the steering gear linkage through a pivotal connection with one or more of them and in the said patent a pivotal connection at the end of an idler arm is shown and described as including upper and lower ball bearing assemblies, more specifically ball bearings running in suitable complementary raceways.

These bearings afford free and substantially uncontrollable relative rotative movement between the idler arm and the elements to which it is connected when the axial pressure on the bearing assemblies is properly adjusted and any modification in that adjustment tending to restrict this freedom induces excessive wear on the bearings and rapidly renders them unserviceable.

It is therefore a principal object of the present invention to provide an idler arm assembly for automotive vehicles which affords a controllable dampening effect upon the free relative rotational movement of the parts affected.

A further object is to provide thrust bearing elements for idler arm bearing assemblies of the aforesaid type wherein freedom of rotative action may be controlled through proper adjustment of the frictional relation between a polished end surface presented by a hardened steel bearing sleeve and a thrust washer presenting a softer surface in rotative engagement therewith.

Other objects, purposes and advantages of the invention will hereinafter more fully appear or will be understood from the following description of a preferred embodiment thereof wherein reference will be had to the accompanying drawing in which:

FIG. 1 is a perspective view of a typical automotive vehicle idler arm shown connected at one end with the arm supporting bracket of the vehicle and having at its other a spindle for reception of an appropriate element of the steering gear linkage with its cooperative bearing assemblies and other accessories (not shown) which may be identical with those associated with the arm where it is supported from the bracket;

FIG. 2 is an axial enlarged section of the bearing assemblies of FIG. 1 partly broken away in section, and FIG. 3 is an exploded fragmentary side elevation on a scale smaller than FIG. 2 showing separated from each other the several elements illustrated in the latter as viewed from the right.

Referring now more particularly to the drawing the bracket B, designed to be attached to the frame or other relatively fixed part of a motor vehicle, comprises a bored boss B' in which is entered a spindle 1 disposed at one end of the idler arm A the other end of which carries a similar spindle 2 adapted for connection with the steering gear linkage (not shown) by means preferably identical with the connection of spindle 1 to boss B' and now to be more fully described. Said means include a retaining cap or cover 3 disposed against an integral flange 4 projecting radially from the idler arm spindle, an elastomeric cushion seal 5 and a thrust washer 6 contained in the cover, the latter having its free edge turned inwardly to engage in a groove 7 in a sleeve 8 press fitted into boss B' while in opposition in respect to the latter the spindle receives another somewhat similar sleeve 9, a thrust washer 10, elastomeric cushion seal 11 and cover 12, these last three parts normally being identical respectively with thrust washer 6, cushion seal 5 and cover 3, cover 12 having its edge entered in groove 14 in sleeve 9, which in turn is press fitted into boss B'. The several parts are retained in assembled relation with spindle 1 and boss B' by a castellated nut 15 threaded on the spindle and secured by a cotter pin 16 entered through a suitable transverse hole in the spindle in known manner.

The several parts of my assembly to which general reference has just been made will now be described and their functions explained in greater detail. Sleeves 8, 9 which are virtually identical save that sleeve 9 is somewhat longer axially than sleeve 8 to afford space for reception of a pressure lubrication system fitting 17, are made from steel sutiably hardened with their end faces 18, 19 which respectively engage thrust washers 6, 10 burnished and have knurling 20 on those portions extending into boss B whereby they are securely held in coaxial relation in the latter when pressed into it, the clearances between the boss and the sleeves adjacent the knurling being exaggerated in FIG. 2. Preferably end faces 18, 19 are slightly relieved adjacent the bore in each sleeve, the inner surface of each such bore being reamed or lapped to provide radial bearing surfaces for spindle 1 while shoulders 21, 22 on the sleeves respectively insure their axial stability with relation to boss B'.

The thrust washers 6, 10 which as noted may be identical are preferably formed from bronze clad steel of appropriate thickness, such as about .015" of bronze clad on .087" steel but may be of other suitable material. Desirably the washers have impressed in their sleeve-engaging faces, i.e. those of bronze when bronze clad steel is used, radial grooves 23 to aid in distribution of lubricant while complementary raised ribs 24 on their opposite faces tend when assembled therewith to sink into the resilient cushion seals 5, 11 to inhibit relative rotation between these parts. The cushion seals are made of neoprene or other lubricant resistant elastomer about .060" thick and the bearing covers or caps 3, 12 preferably spun from 28 gage steel have radial ribs 25 pressed from their inner faces similarly to sink into the seals to inhibit relative rotation.

Thus it will be seen that when the several components are brought together on spindle 1 in the relation illustrated in FIG. 2 nut 15 may be set up on the spindle to provide within limits substantially any desired degree of frictional resistance to relative rotation between sleeves 8, 9 and thrust washers 6, 10 respectively, the former being stationary in boss B' and the latter sufficiently secured to spindle 1 to turn therewith relatively to the sleeves when the arm is rotatively moved in the steering of the vehicle with which it is associated. Rotative looseness of the parts which would enable road shocks and vibrations to be directly transmitted to the steering wheel and hence to the operator's arms are thus effectively dampened out and controlled. Moreover the skirts 29, 30, if they may be so termed, of covers 3, 12 overlying the planes of bearing of the sleeves and their respective thrust washers, and with their edges entered into the grooves in the sleeves but not secured therein, effectively exclude foreign matter from the interacting bearing surfaces without restraining their relative rotative movement and also tend to confine within the bearing lubricant introduced through fitting 17.

An advantage of the assemblies embodying the invention is that they readily may be produced in dimensions appropriate for installation in existing vehicles as replacements for original equipment which has become worn or for some other reason relatively unserviceable, as when there appears a tendency in a steering gear to develop "shimmy" when travelling over rough roads or even smoother ones at certain speeds.

While I have herein described one embodiment of the invention with considerable particularity it will be understood I do not desire or intend thereby to be limited or confined in any way as changes and modifications in the form, construction, arrangement and relationship of the several components will readily occur to those skilled in the art and may be utilized if desired without departing from the spirit and scope of the invention as defined in the appended claims.

Having thus described my invention, I claim and desire to protect by Letters Patent of the United States:

1. A steering gear idler arm assembly comprising an idler arm spindle, a boss having an aperture for receiving the spindle in coaxial relation therewith and connecting the arm to an adjacent element, a metallic sleeve entered in said boss in fixed relation thereto providing a radial bearing for the spindle and presenting a plane surface axially outwardly spaced from the boss normal to the spindle axis, an annular friction washer receiving the spindle and substantially coextensive and engageable with said surface, a resilient sealing washer also receiving the spindle and engaging the friction washer, a bearing cover enclosing said friction and sealing washers having an edge entering a groove in the sleeve, and means carried by the spindle embracing the cover for compressing said sealing washer to thereby maintain the friction washer in frictional engagement with said sleeve surface.

2. A steering gear idler arm assembly adapted for association with a boss constituting an element of the assembly and having a cylindrical bore, comprising a pair of cylindrical sleeves for entrance in said bore providing externally knurled zones press fitted thereinto in fixed relation to the boss and internal coaxial radial bearings, shoulders on the sleeves presenting plane surfaces normal to their axes and peripheral grooves proximate said surfaces, a bi-metallic friction washer substantially coextensive with and engaging each of said surfaces, a resilient washer overlying each of said friction washers, means on the friction washers cooperative with the resilient washers to inhibit relative rotation therewith, annular covers each enclosing a friction washer and a resilient washer and having an edge entered in said groove in the adjacent sleeve, and means adapted when a spindle constituting another element of the assembly is entered in the sleeves, washers and covers for cooperation with the spindle to embrace said covers and maintain said resilient washers under compression.

References Cited in the file of this patent

UNITED STATES PATENTS

| | | |
|---|---|---|
| 2,179,575 | Hosking | Nov. 14, 1939 |
| 2,565,571 | Naumann | Aug. 28, 1951 |
| 2,642,318 | Ricks | June 16, 1953 |
| 2,689,756 | Carlson | Sept. 21, 1954 |
| 2,809,049 | Carlson | Oct. 8, 1957 |
| 2,853,327 | Traugott | Sept. 23, 1958 |
| 3,072,448 | Melton et al. | Jan. 8, 1963 |
| 3,078,113 | Carlson | Feb. 19, 1963 |
| 3,112,123 | True | Nov. 26, 1963 |